Patented Oct. 10, 1933

1,929,870

UNITED STATES PATENT OFFICE 1,929,870

PROCESS FOR MAKING ESTERS FROM OLEFINES

Robert M. Isham, Okmulgee, Okla., assignor of three-fourths to William B. Pine, Okmulgee, Okla.

No Drawing. Application October 11, 1932
Serial No. 637,351

26 Claims. (Cl. 260—106)

This invention relates to a process for the treatment of olefines or olefine-bearing hydrocarbons, for the production of useful esters, and this application is a continuation in part of my prior copending application Serial No. 590,304, filed February 1, 1932.

Methods for the production of esters from olefines and organic acids are known in the art. It is known for example that an olefine and an organic acid can be caused to unite by heating the same to very high temperatures in the neighborhood of 250° to 300° C. either alone or with the addition of anhydrous zinc chloride as a catalyst. Due to the high temperature and the slowness and incompleteness of the reaction this method has never offered any commercial possibilities. One of the principal difficulties is that at temperatures above approximately 100° C. there is a simultaneous destruction of the ester, due to a reversal of the reaction, which is followed by the polymerization of the olefine so that it is no longer available to form the ester. Another method for esterifying organic acids and olefines consists in treating the same in the presence of sulfuric acid at relatively low temperatures less than 100° C., but this method also involves certain disadvantages. For example, the sulfuric acid is soluble in the hydrocarbon ester layer and hence the acid must be neutralized before the distillation of these materials to produce the pure ester. Moreover, sulfuric acid is relatively violent in its effects and tends to cause polymerization and consequent loss of the olefine material together with the presence in the final product of undesirable polymerization products which are of the same boiling range as the esters.

One of the objects of the present invention is to provide a novel process for esterification of organic acids and olefines which may be carried out at relatively low temperatures and with a speed of reaction sufficient to render the process commercially practicable.

Another object is to provide a novel process for esterification of organic acids and olefines involving the use of catalysts such as sulfonic acids which are insoluble in the hydrocarbon ester layer whereby the acid and ester separate by gravity and the acid may be retained in the apparatus for further use.

A further object is to provide a novel process for esterifying organic acids and olefines whereby the final product comprises only pure ester free from polymerization products and the like.

A still further object is to provide a novel process for esterifying organic acids and olefines wherein intermediate products are formed which are volatile only at high temperatures so that polymerization products and the like may be removed from said intermediate products before the final esters of lower boiling point are formed.

Another object is to provide a novel process of producing esters from sulfonic acids and olefines wherein sulfonate esters are produced as intermediate products useful per se and also adapted after purification for reaction with organic acids to produce useful esters of organic acids and olefines.

A further object is to provide a process for esterification of organic acids and olefines wherein the free or uncombined organic acid is recovered in anhydrous condition suitable for reuse.

Generally speaking, any olefine-bearing material may be treated by a process embodying the invention. For example, a fraction of cracked gasoline containing olefines is well suited for treatment according to the present invention to produce esters of organic acids. Other starting materials are pressure-still gases arising from the cracking of petroleum fractions, or olefine-containing gases resulting from the cracking of other hydrocarbon material such as the residue gas resulting from the operation of natural gasoline plants. A fraction of cracked gasoline distilling below 80° C. and containing principally amylenes and hexylenes together with some lower boiling hydrocarbon gives good results when treated in accordance with the invention and excellent results have also been obtained with a fraction distilling between 80° C. and 125° C. These temperatures, however, are not limiting, as the boiling point of the olefines may be considerably higher. In addition to fractions of cracked gasoline, olefine-containing gases, etc., pure olefines, such as amylene, or a mixture of pure olefines, or other suitable olefine-bearing materials may also be employed as starting materials.

Any sulfonic acid is suitable for the process, including both aliphatic and aromatic acids. Examples are naphthalene sulfonic acid, ethylene disulfonic acid, benzene sulfonic acid, etc. As above stated, these sulfonic acids are substantially insoluble in the hydrocarbon ester layer, and as a consequence, the ester-containing materials may be separated from the acid without neutralizing the same, the acid remaining in the apparatus and being available for use with a fresh charge of olefines and organic acid. The action of the sulfonic acids is relatively not violent and little polymerization of the olefines takes place, so that the end products are purer and less contaminated than when a strong acid such as sulfuric acid is used. Moreover, when the process is carried out in two steps as explained hereinafter, intermediate products are formed which are sulfonate esters resulting from the union of the olefines and the sulfonic acid. These sulfonate esters constitute useful products per se, and furthermore they have a relatively high boiling point as compared with the olefines and consequently may be purified by distillation and obtained in a substantially pure state. Accordingly when the sulfonate esters are reacted with the organic acid, esters in a substantially pure state are obtained.

The acid employed is any organic carboxylic acid and the particular acid selected will depend upon the materials available and upon the resultant products desired. These organic acids may be of either the aliphatic or aromatic series. Examples are acetic acid, propionic acid, butyric acid, benzoic acid, etc.

In some cases the olefine-bearing starting materials are subjected to preliminary treatment of any suitable type in order to remove therefrom substances which would tend to prevent or inhibit the formation of the desired end products. For example, the preliminary treatment may be of a kind known to the art and consisting in subjecting the olefine-bearing materials to the action of sulfuric acid of 63% to 65% concentration, at ordinary room temperatures and preferably with agitation, until the undesired olefines combine with the acid and then removing the same with the acid from the starting material. This treatment removes from the materials olefines which would yield relatively unstable tertiary esters, unsaturated compounds such as acetylenes and dienes which are very readily polymerized in contact with acid, etc. This preliminary treatment is ordinarily desirable in the case of gasoline fractions but is not always necessary, its use depending on the particular materials being treated.

Where organic acid esters are to be formed by the direct union of an olefine with an organic acid, suitable quantities of a desired organic acid such as acetic acid and of an olefine-bearing material are mixed with a quantity of sulfonic acid, the mixture being preferably agitated for a considerable period until substantially complete esterification of the acid takes place. Preferably an excess of olefines over the theoretical amount necessary to combine with the organic acid is used since normally the acid is the higher priced reagent, the amount of sulfonic acid being preferably approximately equal in weight to the organic acid. It will be understood, however, that the exact proportions are not critical. Thus an excess of organic acid may be employed if desired instead of an excess of olefines, in which case the esterification proceeds until the olefines are exhausted. Within reasonable limits, an increase in the amount of sulfonic acid speeds up the reaction, but very large quantities of acid are preferably avoided.

The temperature at which the reaction proceeds may vary considerably from about 25° C. up to approximately 100° C. In general, it is preferred to employ a temperature in the neighborhood of 50° C. at which temperature the reaction proceeds favorably. By increasing the temperature to 100° C. and above, the reaction may be speeded up, but at and above 100° C. there takes place a simultaneous destruction of the ester as stated above. The time necesary for completion of the reaction will vary considerably depending on the temperature employed and on the amounts and kinds of materials employed. For example, using naphthalene sulfonic acid and a mixture containing one mol. of acid (acetic, propionic or butyric) and 1½ mol. of olefine, between 60% and 70% of the acid has been esterified in thirty-two hours at a temperature of approximately 100° C. At 75° C. slightly more than 70% esterification of acetic acid has been obtained in seventy-two hours. Using a somewhat larger proportion of benzene sulfonic acid instead of naphthalene sulfonic acid, approximately 87% esterification of acetic acid with amylene was obtained in sixty-four hours at 50° C. With ethylene disulfonic acid, approximately 91% esterification has been obtained in 72 hours at 50° C. These results indicate the relatively wide ranges of temperature and times which are suitable for the process.

After the reaction is completed, the esters are recovered in any suitable manner. Preferably the sulfonic acid is allowed to settle out of the mixture of esters and hydrocarbons in which it is insoluble. Thereafter the hydrocarbon materials are separated from the acid, either by washing with water or by fractional distillation as described hereinafter, and the various esters are then separated from one another preferably by distillation, either by a direct dry distillation or a steam distillation followed by a dry distillation. The sulfonic acid remains in the apparatus for use with the next charge of organic acid and olefine.

A specific example of this process is as follows:
Three hundred gallons of a fraction of cracked gasoline, which had been treated with 63% sulfuric acid, washed with water, and fractionally distilled up to a maximum boiling point of 80° C. and which contained 15% of material soluble in concentrated sulfuric acid, was treated in a closed agitator with 14 gallons of glacial acetic acid, and 14 gallons of benzene sulfonic acid, for 72 hours, with constant agitation. At the end of this period an analysis of the gasoline layer showed 84.2% of the acetic acid to be present as ester, and 12.5% as free acid. The mixture was cooled and the sulfonic acid permitted to settle out, after which the gasoline layer was drawn off and washed with water for removal of uncombined acetic acid and any traces of sulfonic acid that may be present. The gasoline was removed by direct distillation up to 80° C. after which the esters were recovered by steam distillation of the residue. The yields were as follows:— gasoline 265.6 gal., crude esters 29.4 gal., residue from steam distillation 11.0 gal. On fractionation of the crude esters they were found to consist of a mixture of secondary amyl, hexyl and heptyl acetates, of approximately 96% purity.

In many cases the hydrocarbon ester layer that is drawn off after the sulfonic acid is permitted to settle out will contain traces of sulfonic acid and appreciable quantities of uncombined organic acid. In typical cases amounts of sulfonic acid varying from 1% to 3% have been found in the mixture, the amount varying with the particular acid used, being greater for instance with benzene sulfonic acid than with naphthalene sulfonic acid. The amount of sulfonic acid present also varies with the proportion of ester in the reaction product, increasing as the proportion of ester increases. It is desirable to recover the organic acid from the reaction product in anhydrous condition for further use in the process, instead of washing it out with water as described above, and this can be accomplished by fractional distillation except that when sulfonic acid is present, decomposition of the esters results when the temperature is increased to about 110° C. or more.

It has been found, however, that the organic acid can be recovered in anhydrous condition in such cases by selectively neutralizing the sulfonic acid prior to distillation, leaving the uncombined organic acid to be separated by fractional distillation. In carrying out this process, the amount of sulfonic acid present is preferably determined in any suitable way and the theoretical amount of a suitable neutralizing agent is then added to the reaction product together with a small amount of water. In the case of sulfonic acid, the neutralizing agent may be a finely powdered metal salt of an organic carboxylic acid as for example sodium or calcium acetate or propionate or benzoate, or it may be an alkali or alkaline earth or other basic oxide, hydroxide or carbonate or other basic material such as ammonia. The amount of water added is preferably small and ordinarily 0.5% to 5% will be sufficient. In the event that the reaction product contains water, the addition of further water may be unnecessary, or some other ionizing solvent such as alcohol may be substituted for water.

Under these conditions a selective reaction occurs whereby the sulfonic acid is converted to a neutral salt, but the uncombined organic acid remains unaffected. For instance, sodium acetate reacts with naphthalene sulfonic acid to produce sodium naphthalene sulfonate and acetic acid, and calcium hydroxide reacts with naphthalene sulfonic acid to produce calcium naphthalene sulfonate and water. The sulfonic acid is thus converted to a neutral, insoluble salt without in any way affecting the free organic acid present in the reaction product.

After the neutralizing reaction is complete, the reaction product is treated in any suitable way as by fractional distillation for the recovery of the uncombined organic acid in anhydrous condition and of the esters in substantially pure state, the distillation taking place either before or after filtering off the solid sulfonate. In the case of distillation before filtering, the small amount of water present is carried out at a temperature below 80° C. by the gasoline or other olefine-containing material present. On the other hand, if the solid sulfonate is filtered off before distillation, the water is largely retained as water of crystallization in the filter cake. The fractional distillation is then carried up to a suitable temperature depending on the organic acid used until substantially all of the uncombined organic acid is recovered and the undistilled esters are then separated from hydrocarbon polymers in any suitable manner as by steam distillation.

As a typical example of the complete process embodying the selective neutralization procedure, 300 gallons of a fraction of cracked gasoline distilling below 80° C., after subjection to preliminary purification with sulfuric acid as described above, was charged into the reaction chamber together with 50 gallons of glacial acetic acid and 30 gallons of beta naphthalene sulfonic acid. After agitating for 72 hours at a temperature of 70° C., the reaction mixture was cooled and the sulfonic acid allowed to settle out, whereupon the upper layer consisting of gasoline, esters and unreacted acetic acid together with a small amount of naphthalene sulfonic acid was drawn off and measured. The volume of the upper layer was 300 gallons and analysis showed the mixture to contain 13.4 gallons of uncombined acetic acid and esters corresponding to 30.4 gallons of acetic acid, the balance of the acetic acid being retained in free and combined form in the reaction chamber. Analysis further showed the presence of 24.7 pounds of naphthalene sulfonic acid per 100 gallons of the reaction mixture drawn off. Accordingly 4.8 pounds of hydrated lime containing 69.5% of calcium oxide were added per 100 gallons of the reaction mixture, and thereafter 0.7 gallons of water was added per 100 gallons of reaction mixture. After agitation for about five minutes, the sulfonic acid was neutralized as indicated by a change in the color of the mixture from green to brown.

The reaction mixture was then distilled fractionally, fractions being taken up to a temperature of 130° C. for recovery of the acetic acid. On refractionation of these fractions, the acetic acid was concentrated in the portion distilling between 115° C. and 120° C., constituting a product containing 71% acetic acid, 29% esters and hydrocarbons, and no water which was suitable for use in making up a fresh charge for the reaction chamber. Further fractionation separated the distilled esters into secondary amyl, hexyl, heptyl and octyl acetates. The undistilled esters were then separated from hydrocarbon polymers by steam distillation.

The calcium naphthalene sulfonate formed during the neutralization step was contained in the water drawn from the bottom of the still during steam distillation, and by acidifying with the calculated amount of sulfonic acid, filtering off the calcium sulfate, and concentrating, the naphthalene sulfonic acid was recovered for further use. In another instance in which the reaction mixture was filtered to remove the calcium naphthalene sulfonate before distillation, the filter cake was washed with a fraction of gasoline distilling below 80° C., the washings being added to the filtrate and the whole subjected to fractional distillation as above. The filter cake was steamed free of gasoline, made into a thin paste with water, and treated with sulfuric acid as described above for recovery of the naphthalene sulfonic acid. It will also be apparent that the sulfonic acid can be recovered in any other suitable way for further use in esterifying the organic acid and olefines.

The above described procedure of selective neutralization of the catalytic acid such as sulfonic acid is desirable in many cases for the recovery of the organic acid in anhydrous state and also for the recovery of the catalytic acid, both of which can be used again in making up a fresh charge for the reaction chamber. It will also be understood that the invention from this aspect of selective neutralization is not limited to processes wherein the catalytic acid is a sulfonic acid, since the steps of selective neutralization of the catalytic acid and recovery of the organic acid from the hydrocarbon ester materials can be employed when other catalytic acids such as sulfuric acid are employed.

As stated above, the reaction between olefines and organic acid can be carried out in two steps with intermediate formation of sulfonate esters. For example, when an olefine and a sulfonic acid such as benzene sulfonic acid are reacted together in accordance with the procedure set forth above, the benzene sulfonic acid is esterified. Any unreacted benzene sulfonic acid may then be removed, as by washing with water, and thereafter any excess olefine is removed as by distillation. These sulfonate esters can thus be obtained in purity of 85% or more. The sulfonic acid may be added in theoretical proportion to the amount of olefine to be treated, but as stated above the exact proportions are not critical. The temperatures employed for this reaction, as well as the time necessary for completion of the reaction, may vary within the limits given above. For example, in one instance in which amylene and benzene sulfonic acid were reacted to produce amyl benzene sulfonate, the sulfonic acid was practically completely esterified after treatment of these materials with agitation for about seventy-two hours at 50° C.

Sulfonate esters may be obtained by the above reaction in the form of a mixture of esters the constituents of which will depend on the olefines present in starting materials, and may be preserved as a neutral mobile liquid having a specific gravity about that of amyl benzene sulfonate obtained as described above, that is about 1.111. These esters are practically non-volatile and can hardly be distilled, even in vacuo, without decomposition. These esters, or a mixture thereof, are available for further treatment and uses, such as conversion into organic acid esters, alkylation of hydroxy compounds, etc. For conversion into organic acid esters, the sulfonate esters such as the amyl benzene sulfonate referred to above are heated with acetic or other acid with the production of amyl acetate and benzene sulfonic acid. Since as stated above the sulfonate esters can be purified by distillation, the final acetates or other organic esters can be produced in a very pure state substantially free from olefines or polymerization products which tend to be formed when the reaction is carried out in one step.

A specific example of this process is as follows:

Ten gallons of benzene sulfonic acid was agitated with 30 gallons of amylene, in a closed container, at 50° C., for 75 hours. At the end of this time the material was cooled and treated with 30 gallons of petroleum ether, and the unreacted acid allowed to settle out. The petroleum ether solution was drawn off, washed with water and concentrated by distillation in vacuo, up to a maximum temperature of 80° C. The residue of amyl benzene sulfonate amounted to 11.53 gallons. Analysis showed it to contain 85% by weight of amyl benzene sulfonate. Its specific gravity was 1.111, and it was a neutral mobile liquid. On dissolving in petroleum ether and heating for 72 hours with the calculated amount of acetic acid, it was quantitatively converted to amyl acetate and benzene sulfonic acid. After separating from the sulfonic acid and purifying by fractional distillation, amyl acetate of 99% purity was obtained.

The invention therefore includes the discovery that sulfonic acids can be used to great advantage in the treatment of olefine-bearing materials. When used to promote the direct union of an olefine and an organic carboxy acid, the sulfonic acid effectively promotes the desired reaction without the formation of polymerization products and loss of the olefine-bearing materials. Moreover, since the sulfonic acid is practically insoluble in the hydrocarbon materials, it may be allowed to settle and be separated from the hydrocarbon materials without neutralization. The sulfonic acid thus remains in the apparatus and can be used over and over again for the treatment of succeeding charges. Moreover, advantage may be taken of this discovery for the production of sulfonate esters of very high purity by the treatment of olefines with sulfonic acids. These sulfonate esters are available for any desired purpose but their production as intermediate products is a particularly advantageous feature of a process for esterifying organic acids with olefines. The sulfonate esters have relatively high boiling points as compared with the olefines and hence may be purified from hydrocarbons formed by polymerization of the olefines, and the resulting organic acid esters are hence free from these objectionable products. On the contrary, when the reaction is carried out in one step, polymerization products may be formed which are of like boiling range with the organic acid esters and which consequently cannot be separated therefrom by distillation.

It will be understood that the invention is not limited to the specific examples given above and that changes may be made in the proportions of the materials and the details of the process without departing from the spirit of the invention. For example, the temperatures employed may vary within a considerable range as indicated above and the time necessary for completion of the reaction may also vary considerably. Moreover, the materials employed are capable of variation within the limits given above. Reference is therefore to be had to the appended claims for a definition of the limits of the invention.

What is claimed is:

1. A process of producing alkyl esters of organic acids which consists in reacting the olefines with a sulfonic acid to produce sulfonate esters and reacting the sulfonate esters with an organic carboxylic acid to produce organic acid esters, agitating the materials while maintaining the reaction temperature between approximately 25° C. and approximately 100° C. until the reaction is substantially complete, allowing the sulfonic acid to settle out of the hydrocarbon materials, removing the latter and recovering the esters therefrom by distillation.

2. A process of producing alkyl esters of organic acids which consists in reacting olefines with a sulfonic acid and the reaction products with an organic carboxylic acid while agitating the same and maintaining a temperature throughout the reaction between 25° C. and 100° C. until the reaction is substantially completed, separating the hydrocarbon materials from the sulfonic acid, and recovering the esters from the hydrocarbon materials.

3. A process of esterifying organic acids and olefines which consists in reacting olefine-containing material with naphthalene sulfonic acid and the reaction products with an organic carboxylic acid, maintaining a temperature between 25° C. and 100° C. throughout the reaction while agitating the materials until the reaction is completed, and separating and recovering the esters.

4. A process of esterifying organic acids and olefines which consists in reacting olefine-containing material with benzene sulfonic acid and the reaction products with an organic carboxylic acid, agitating the materials and maintaining a temperature between 25° C. and 100° C. until the reaction is completed, separating the hydrocarbon materials from the sulfonic acid, and recovering the esters from the hydrocarbon materials.

5. A process of esterifying organic acids and olefines which consists in reacting olefine-containing material with ethylene disulfonic acid and the reaction products with an organic carboxylic acid, maintaining a temperature between 25° C.

and 100° C. throughout the reaction while agitating the materials until the reaction is completed, and separating and recovering the esters.

6. A process of esterifying organic acids and olefines which consists in mixing an organic carboxylic acid with a fraction of cracked gasoline, adding a sulfonic acid to said mixture, agitating the mixture while maintaining a temperature of less than 100° C., and recovering the esters formed in said mixture.

7. A process of esterifying organic acids and olefines which consists in mixing an organic carboxylic acid with a fraction of cracked gasoline, adding benzene sulfonic acid to said mixture, agitating said mixture while maintaining a temperature of approximately 50° C., and recovering the esters from said mixture after the reaction is completed.

8. A process of esterifying organic acids and olefines which consists in mixing an organic carboxylic acid with a fraction of cracked gasoline, adding naphthalene sulfonic acid to said mixture, agitating said mixture while maintaining a temperature of approximately 50° C., and recovering the esters from said mixture after the reaction is completed.

9. A process of esterifying organic acids and olefines which consists in mixing an organic carboxylic acid with a fraction of cracked gasoline, adding ethylene disulfonic acid to said mixture, agitating said mixture while maintaining a temperature of approximately 50° C., and recovering the esters from said mixture after the reaction is completed.

10. A process for producing esters of organic acids and olefines which comprises reacting olefines with a sulfonic acid to produce sulfonate esters, separating and purifying said esters, reacting said esters with an organic carboxylic acid to produce organic acid esters, and separating and recovering said organic acid esters.

11. A process for producing alkyl esters of organic acids which comprises reacting olefines with benzene sulfonic acid to produce benzene sulfonates, separating and purifying said sulfonates, reacting the purified sulfonates with an organic carboxylic acid to produce organic acid esters, and separating and recovering said organic esters.

12. A process for producing alkyl esters of organic acids which comprises reacting olefines with naphthalene sulfonic acid, separating the sulfonate esters formed thereby and purifying said esters, reacting said sulfonate esters with an organic carboxylic acid to produce organic acid esters, and recovering said organic acid esters.

13. A process for producing alkyl esters of organic acids which comprises reacting olefines with ethylene disulfonic acid to produce sulfonates, separating and purifying said sulfonates, reacting the purified sulfonates with an organic carboxylic acid to produce organic acid esters, and separating and recovering said organic esters.

14. A process for producing alkyl esters of organic acids which consists in reacting a sulfonic acid with a fraction of cracked gasoline to produce sulfonate esters, maintaining a temperature between 25° C. and 100° C. during said reaction, separating the sulfonate esters and removing the unconverted olefines and acid therefrom, reacting said esters with an organic carboxylic acid to produce organic acid esters, and separating and recovering said organic acid esters.

15. A process for producing alkyl esters of organic acids which comprises reacting benzene sulfonic acid with a fraction of cracked gasoline while maintaining the temperature between 25° C. and 100° C., recovering the sulfonate esters from the unreacted acid and gasoline fraction, reacting said esters with an organic carboxylic acid to produce organic acid esters, and recovering said organic acid esters.

16. A process for producing alkyl esters of organic acids which consists in mixing naphthalene sulfonic acids with a fraction of cracked gasoline, agitating said mixture while maintaining a temperature between 25° C. and 100° C. until esterification of said acid is completed, separating the sulfonate esters from the unconverted gasoline and acid, reacting said esters with an organic carboxylic acid, and recovering the organic acid esters formed thereby.

17. A process for producing alkyl esters of organic acids which consists in mixing ethylene disulfonic acids with a fraction of cracked gasoline, agitating said mixture while maintainng a temperature between 25° C. and 100° C. until esterification of said acid is completed, separating the sulfonate esters from the unconverted gasoline and acid, reacting said esters with an organic carboxylic acid, and recovering the organic acid esters formed thereby.

18. A process for esterifying a sulfonic acid and olefines which consists in reacting olefines with an organic sulfonic acid at a temperature between 25° C. and 100° C. and with agitation, and recovering the sulfonate esters from the unreacted acid and olefines.

19. A process for esterifying a sulfonic acid and olefines which consists in reacting olefines with an organic sulfonic acid at a temperature between 25° C. and 100° C., removing the unreacted acid, and distilling off the unreacted olefines.

20. A reactive liquor consisting of alkyl sulfonates having a specific gravity of approximately 1.1.

21. A substantially non-volatile neutral reactive liquor consisting of alkyl sulfonates and having a specific gravity of approximately 1.1.

22. A process for producing alkyl esters of organic acids which consists in reacting olefines with a sulfonic acid and the reaction products with an organic carboxylic acid while maintaining a temperature between approximate limits of 25° C. and 100° C., removing the hydrocarbon ester materials and washing out the sulfonic and organic acid, and distilling the residue to recover the esters.

23. A process for producing alkyl esters of organic acids which consists in reacting olefines with a sulfonic acid and the reaction products with an organic carboxylic acid while maintaining a temperature between approximate limits of 25° C. and 100° C., removing the hydrocarbon ester materials and neutralizing the sulfonic acid present, and recovering separately the organic acid and the esters from the residue.

24. A process for producing alkyl esters of organic acids which consists in reacting olefines with a sulfonic acid and the reaction products with an organic carboxylic acid while maintaining a temperature between approximate limits of 25° C. and 100° C., removing the hydrocarbon ester materials and neutralizing the sulfonic acid present by adding a metal salt of an organic carboxylic acid, and recovering the organic acid and the esters separately from the residue.

25. A process for producing alkyl esters of organic acids which consists in reacting olefines with a sulfonic acid and the reaction products with an organic carboxylic acid while maintaining a temperature between approximate limits of 25° C. and 100° C., removing the hydrocarbon ester materials, neutralizing the sulfonic acid present by adding a basic material combining with said sulfonic acid to form a neutral salt, and recovering the esters and organic acid separately from the residue.

26. A process of producing alkyl esters of organic acids which consists in mixing an organic carboxylic acid with a fraction of cracked gasoline and a sulfonic acid while maintaining the temperature between approximate limits of 25° C. and 100° C., removing the hydrocarbon ester materials and neutralizing the sulfonic acid, and fractionally distilling the residue to recover the organic acid and esters separately.

ROBERT M. ISHAM.